United States Patent
Schiffmann et al.

(10) Patent No.: US 6,794,987 B2
(45) Date of Patent: *Sep. 21, 2004

(54) OBJECT DETECTION SYSTEM AND METHOD OF ESTIMATING OBJECT SIZE

(75) Inventors: Jan K. Schiffmann, Newbury Park, CA (US); Lawrence A Humm, West Hills, CA (US)

(73) Assignee: Delphi Technologies, Inc., Troy, MI (US)

( * ) Notice: Subject to any disclaimer, the term of this patent is extended or adjusted under 35 U.S.C. 154(b) by 96 days.

This patent is subject to a terminal disclaimer.

(21) Appl. No.: 10/186,784

(22) Filed: Jul. 1, 2002

(65) Prior Publication Data

US 2004/0000991 A1 Jan. 1, 2004

(51) Int. Cl.$^7$ .............................. B60Q 1/00
(52) U.S. Cl. .................. 340/435; 340/903; 340/917; 701/301
(58) Field of Search .................. 340/435, 903, 340/917; 701/301, 302

(56) References Cited

U.S. PATENT DOCUMENTS

| | | | | |
|---|---|---|---|---|
| 4,626,850 A | * | 12/1986 | Chey | 340/903 |
| 4,818,107 A | * | 4/1989 | Ono et al. | 356/622 |
| 4,827,420 A | * | 5/1989 | Musa | 701/208 |
| 5,191,337 A | | 3/1993 | Brovko et al. | 342/200 |
| 5,212,643 A | * | 5/1993 | Yoshida | 701/212 |
| 5,249,157 A | | 9/1993 | Taylor | 340/903 |
| 5,404,307 A | * | 4/1995 | Odagawa | 701/221 |
| 5,818,355 A | | 10/1998 | Shirai et al. | 340/903 |
| 6,002,974 A | | 12/1999 | Schiffmann | 701/36 |
| 6,085,151 A | | 7/2000 | Farmer et al. | 701/301 |
| 6,199,011 B1 | * | 3/2001 | Matsuda | 701/208 |
| 6,404,328 B1 | | 6/2002 | Alland et al. | |
| 6,438,477 B1 | | 8/2002 | Patterson et al. | |
| 6,469,659 B1 | | 10/2002 | Lajiness et al. | |
| 6,581,006 B2 | | 6/2003 | Cazzell et al. | |
| 6,583,753 B1 | | 6/2003 | Reed | |
| 6,594,614 B2 | | 7/2003 | Studt et al. | |
| 6,615,138 B1 | * | 9/2003 | Schiffmann et al. | 701/301 |

OTHER PUBLICATIONS

Song, T. L., "Observability of Target Tracking with Range–Only Measurements," IEEE Journal Oceanic Engineering, vol. 24, No. 3, Jul. 999, pp. 383–387.
Reif, K., Günther, S., Yaz, E., "Stochastic Stability of the Discrete–Time Extended Kalman Filter," IEEE Trans. Automatic Control, vol. 44, No. 4, Apr. 1999, pp. 714–728.
Julier, S., Uhlmann, J., "A New Extension of the Kalman Filter to Nonlinear Systems," Proc. Of AeroSense: The 11th Int. Symp. On Aerospace/Defense Sensing, Simulation and Controls, 1997, 12 pages.
De Geeter, J., Van Brussel, H. De Schutter, J., "A Smoothly Constrained Kalman Filter," IEEE Trans. Pattern Analysis and Machine Intelligence, vol. 19, No. 10, Oct. 1997, pp. 1171–1177.
Gordon, J., Salmond, D., Smith, A., "Novel Approach to Nonlinear/Non–Gaussian Bayesian State Estimation," IEE Proceedings–F, vol. 140, No. 2, Apr. 1993, pp. 107–113.
Richards, P., "Constrained Kalman Filtering Using Pseudo–Measurements," IEE Colloquium on Target Tracking, 1995, pp. 75–79.
Massicotte, D., Morawski, R., Barwicz, A., "Incorporation of a Positivity Constraint into a Kalman–Filter–Based Algorithm for Correction of Spectrometric Data," IEEE Trans. Instrumentation and Measurement, vol. 44, No. 1, Feb. 1995.

* cited by examiner

*Primary Examiner*—John Tweel
(74) *Attorney, Agent, or Firm*—Jimmy L. Funke; Stefan V. Chmielewski

(57) ABSTRACT

A collision detection system and method of estimating a miss distance of an object and estimating length and width of the object are provided. The collision detection system includes a sensor for sensing an object within a field of view and measuring range and range rate of the sensed object. The collision detection system further includes a controller for estimating a miss distance of the object and further estimating length and width of the object as a function of the range and the range rate.

21 Claims, 8 Drawing Sheets

OBJECT DETECTION SYSTEM AND METHOD OF ESTIMATING OBJECT SIZE

CROSS-REFERENCE TO RELATED APPLICATION

This application is related to U.S. application Ser. No. 10/159,959, filed on May 30, 2002, and entitled "COLLISION DETECTION SYSTEM AND METHOD OF ESTIMATING MISS DISTANCE EMPLOYING CURVE FITTING," the entire disclosure of which is hereby incorporated herein by reference.

TECHNICAL FIELD

The present invention generally relates to object detection and, more particularly, relates to a vehicle object detection system and method of estimating the size of an object such as length and width dimensions.

BACKGROUND OF THE INVENTION

Automotive vehicles are increasingly being equipped with collision avoidance and warning systems for predicting the potential collision with an external object, such as another vehicle or a pedestrian. Upon detecting a potential collision, such systems typically initiate an action to avoid the collision and/or provide a warning to the vehicle operator. Adaptive cruise control systems have been proposed to track a leading vehicle and automatically control the speed of the following vehicle. The ability to accurately predict an upcoming collision also enables a vehicle controller to control and deploy safety-related devices on the vehicle. For example, upon predicting an anticipated collision or near collision with an object, the vehicle seat belt pretensioner could be activated in a timely manner to pretension the seat belt, thereby enhancing the application of the safety device. The controller could also deploy a warning signal to notify the vehicle driver of a predicted collision with an object.

In conventional target tracking systems employed on automotive vehicles, the host vehicle is generally equipped with a sensor arrangement that acquires range, range rate, and azimuth angle (i.e., direction to target) measurements for each tracked target within a field of view. The sensor arrangement employed in many conventional collision detection systems is generally complex and costly and includes a plurality of radar beams or laser beams covering a field of view. In order to detect an anticipated vehicle collision with an object, the conventional collision detection system generally senses the presence of an object, tracks the movement of the sensed object, measures the azimuth angle of the object, range to the object, and range rate of the object, all relative to the host vehicle.

In addition to detecting the presence of an anticipated collision with an object it is also desirable to know the size of the object in order to determine whether or not to deploy one or more countermeasures and, if so, to further determine what type of countermeasures to deploy. For example, for an anticipated collision with a relatively large object, such as another vehicle or a pedestrian, it may be desirable to deploy certain countermeasures such as pretensioning the seat belt and deploying one or more air bags. However, for relatively small objects, such as a beverage container, no countermeasure deployment may be necessary. Further, it may be desirable to differentiate between certain types of objects, such as a pedestrian and a vehicle so as to deploy different countermeasures depending on the object size and/or type of object.

The above-mentioned prior known collision detection systems generally require relatively complex and expensive sensor arrangements which use multiple sensors that are required to measure the azimuth angle of the object, relative to the host vehicle, in addition to obtaining the range and range rate measurements. It is generally desirable to reduce the complexity and cost of systems and components employed in automotive vehicles.

It is therefore desirable to provide for a vehicle collision detection system which is able to estimate miss distance of an object and predict a potential collision with an approaching object that offers reduced complexity and cost. It is further desirable to provide for a cost affordable detection system and method of estimating the size of the object.

SUMMARY OF THE INVENTION

In accordance with the teachings of the present invention, a detection system and method of estimating a size dimension of an object are provided. According to one aspect of the present invention, the detection system includes a sensor for sensing an object within a field of view. The sensor measures range and range rate of the sensed object. The detection system further includes a controller for estimating a size dimension of the object as a function of the range and range rate. The controller estimates the size dimension absent an azimuth angle measurement of the object.

According to another aspect of the present invention, a method of estimating a size dimension of an object is provided. The method includes the steps of sensing the presence of an object, tracking the sensed object, measuring range to the object for each of a plurality of measurements, and determining range rate of the object for each of the plurality of measurements. The method also includes the steps of estimating a size dimension of the object as a function of the range and the range rate. The size dimension is estimated absent an azimuth angle measurement.

Accordingly, the detection system and method of estimating a size dimension of an object according to the present invention advantageously estimates a size dimension (e.g., length or width) of an object without requiring a complex and costly sensor arrangement, such as those which determine an azimuth angle measurement of the object.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
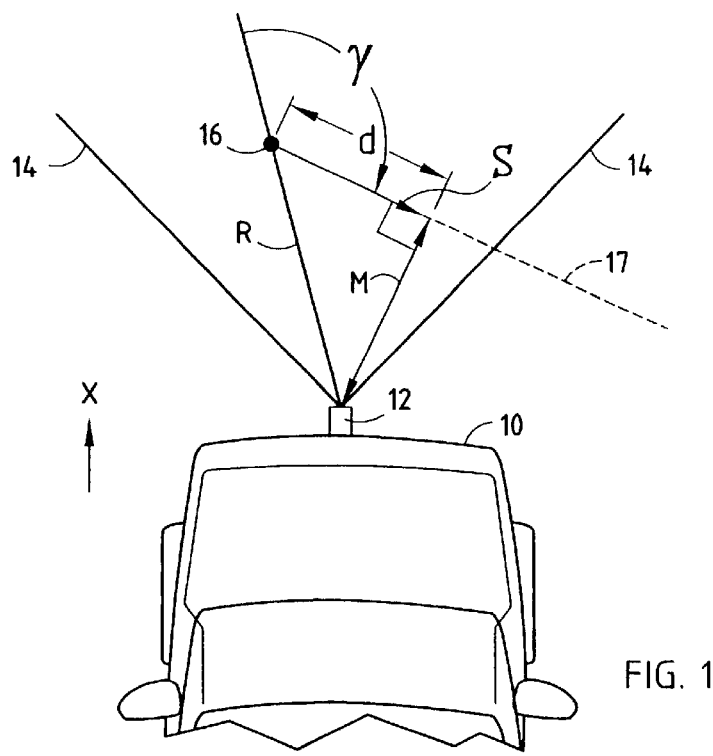
FIG. 1 is a plan view illustrating the geometry of a collision detection system employed on a vehicle.

Referring to FIG. 1, an automotive vehicle 10 is generally illustrated having a collision detection system including a radar sensor 12 mounted thereto to cover a desired field of view 14 in front of the vehicle 10. The vehicle collision detection system senses and tracks one or more objects, such as moving target 16, and estimates a miss distance M for each sensed object. The miss distance M is the closest anticipated distance between the target 16 and the vehicle 10. Using the estimated miss distance M, the collision detection system is able to detect an anticipated collision between the vehicle 10 and the target 16, thereby allowing for responsive action to be taken. The collision detection system further estimates size dimensions of length and width of the object 16 by exploiting differences in range and range rate observed over the span of the distributed object. The estimated size dimensions of length and width of the object 16 provide a useful indication of the size of the object which can be useful in determining whether to deploy one or more countermeasures and what type of countermeasure(s) to deploy. The estimated length and width could further be useful in combination with information from other sensors, such as a camera to identify the location of an object in an image.

The sensor 12 may include a single sensor or a plurality of sensors arranged to cover the field of view 14 to sense the presence of one or more objects. The sensor 12 also tracks the relative movement of each sensed object within the field of view 14. Sensor 12 measures the range (radial distance) R to the target object 16, and further measures the range rate (time rate of change of radial distance) $\dot{R}$ of the target object 16. The range R is the measured radial distance between the vehicle 10 and the object 16 which is output from sensor 12 and may include sensor noise. The range rate $\dot{R}$ is the measured rate of change of the range R of the object 16 as a function of time relative to the host vehicle 10 which may be output from sensor 12 and may also include noise. Sensor 12 may be a Doppler radar sensor that determines range rate $\dot{R}$ based on the radar Doppler effect. Alternately, the range rate $\dot{R}$ may be determined by computing the time rate of change (i.e., derivative) of sensed range R. Sensor 12 may include a commercially available off-the-shelf wide-beam staring microwave Doppler radar sensor. However, it should be appreciated that other object detecting sensors including other types of radar sensors, video imaging cameras, and laser sensors may be employed to detect the presence of an object, track the relative movement of the detected object, and determine the range and range rate measurements R and $\dot{R}$ that are processed to estimate the miss distance M and length and width of the object 16.

The collision detection system and method of the present invention advantageously estimates the miss distance M and estimates length and width size dimensions of the object 16 as a function of the range and range rate measurements R and $\dot{R}$, without the requirement of acquiring an azimuth angle measurement of the object. Thus, the collision detection system of the present invention is able to use a reduced complexity and less costly sensing arrangement.

Figure 2:
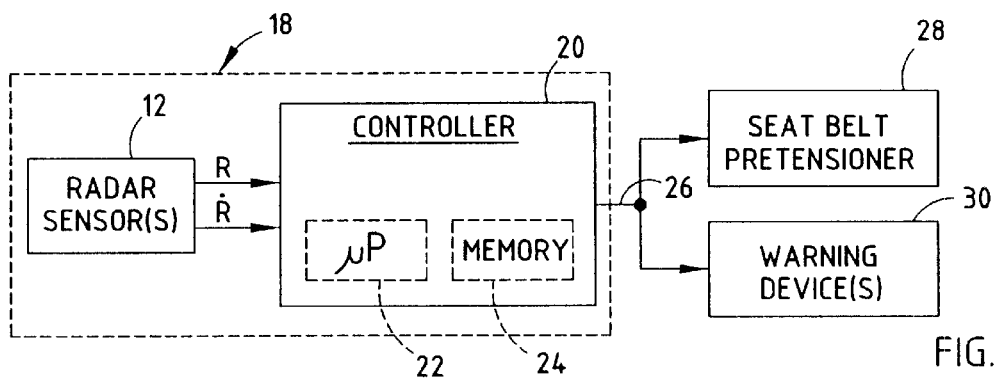
FIG. 2 is a block diagram illustrating the collision detection system.

Referring to FIG. 2, the collision detection system 18 is shown including radar sensor 12 and a controller 20. Controller 20 preferably includes a microprocessor-based controller having a microprocessor 22 and memory 24. Memory 24 may include random access memory (RAM), read-only memory (ROM), and electrically erasable programmable read-only memory (EEPROM). Controller 20 may be a commercially available off-the-shelf controller and may be dedicated to precrash processing or object detection processing, or may share processing capability with other vehicle functions.

The controller 20 receives the range measurement R and range rate measurement $\dot{R}$ from the radar sensor 12 and processes the received range and range rate measurements R and $\dot{R}$ with a miss distance estimation and collision detection routine to determine the miss distance M of the target object 16 relative to the host vehicle 10. The collision detection routine processes the estimated miss distance M to determine whether a potential collision of the object 16 with the vehicle 10 may occur. The controller 20 further processes the received range and range rate measurements R and $\dot{R}$ with length and width estimation routines to estimate the size dimensions of length and width of the object as an indication of the size of the object. By providing an indication of the size of the object, the controller 20 may decide whether or not to deploy any countermeasures in response to an anticipated collision based on object size, and may further decide which type of countermeasures to deploy based on object size.

The controller 20 generates an output signal 26 in the event that an anticipated vehicle collision has been determined. The output signal 26 may be supplied as an input to one or more devices in the vehicle, such as a seat belt pretensioner 28, to activate the device(s) in anticipation of an anticipated upcoming collision. According to the example shown, the seat belt pretensioner 28 may be controlled to pretension the seat belt just prior to the anticipated vehicle collision to eliminate slack in the restraining device. The output signal 26 may be provided to one or more warning devices 30 to warn the vehicle operator and occupants of an anticipated vehicle collision. It should further be appreciated that other devices may be deployed as countermeasures including vehicle air bags, pop-up roll bars, and other safety-related devices.

Figure 3:
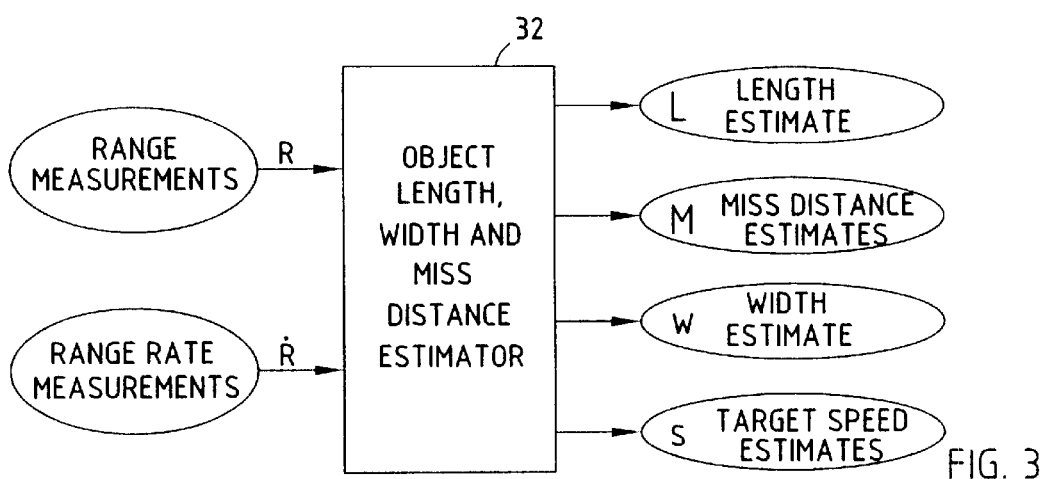
FIG. 3 is a block diagram illustrating the length, width, and miss distance estimator of the collision detection system.
Figure 4:
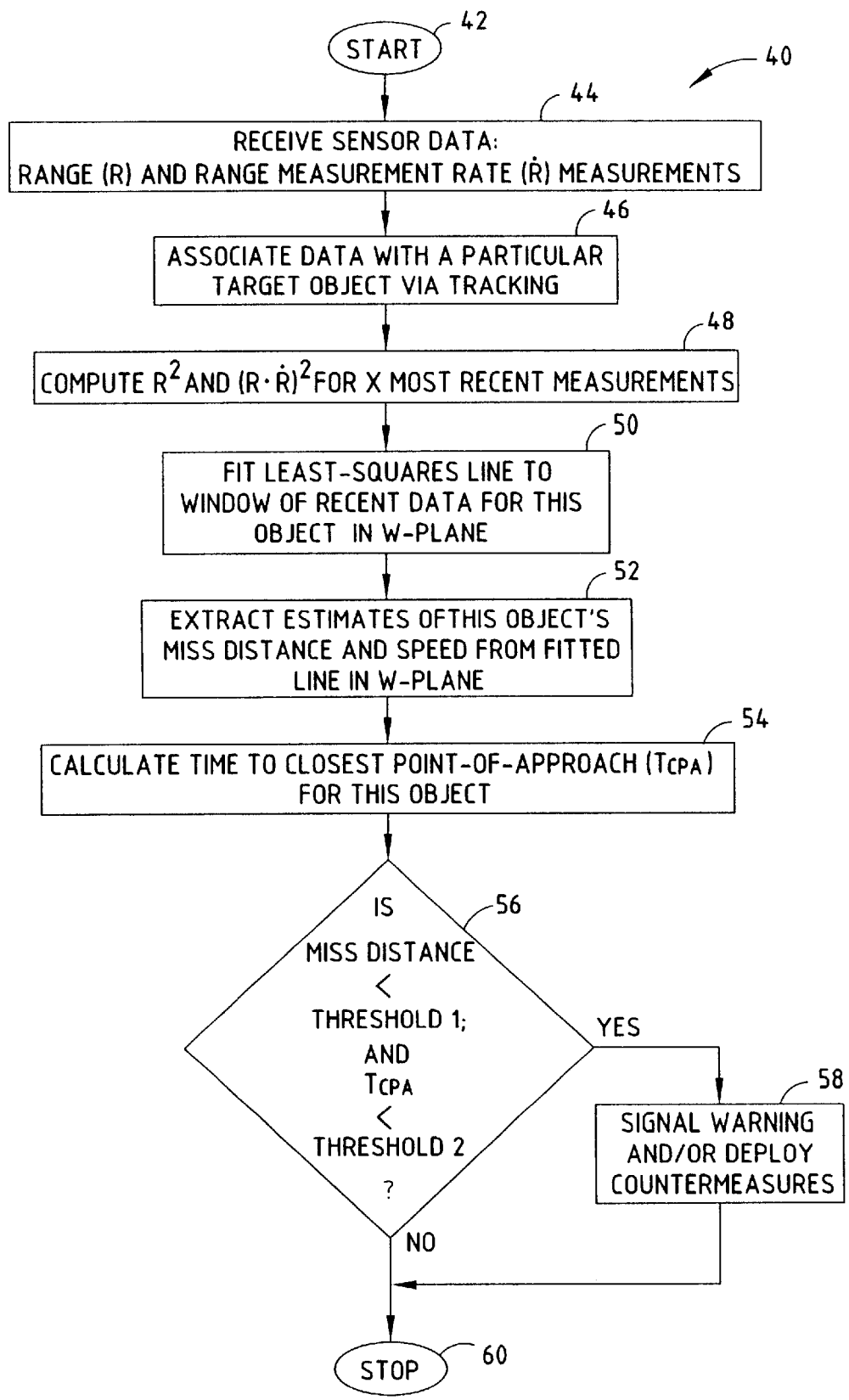
FIG. 4 is a flow diagram illustrating a routine for estimating and using the miss distance in collision detection.
Figure 10:
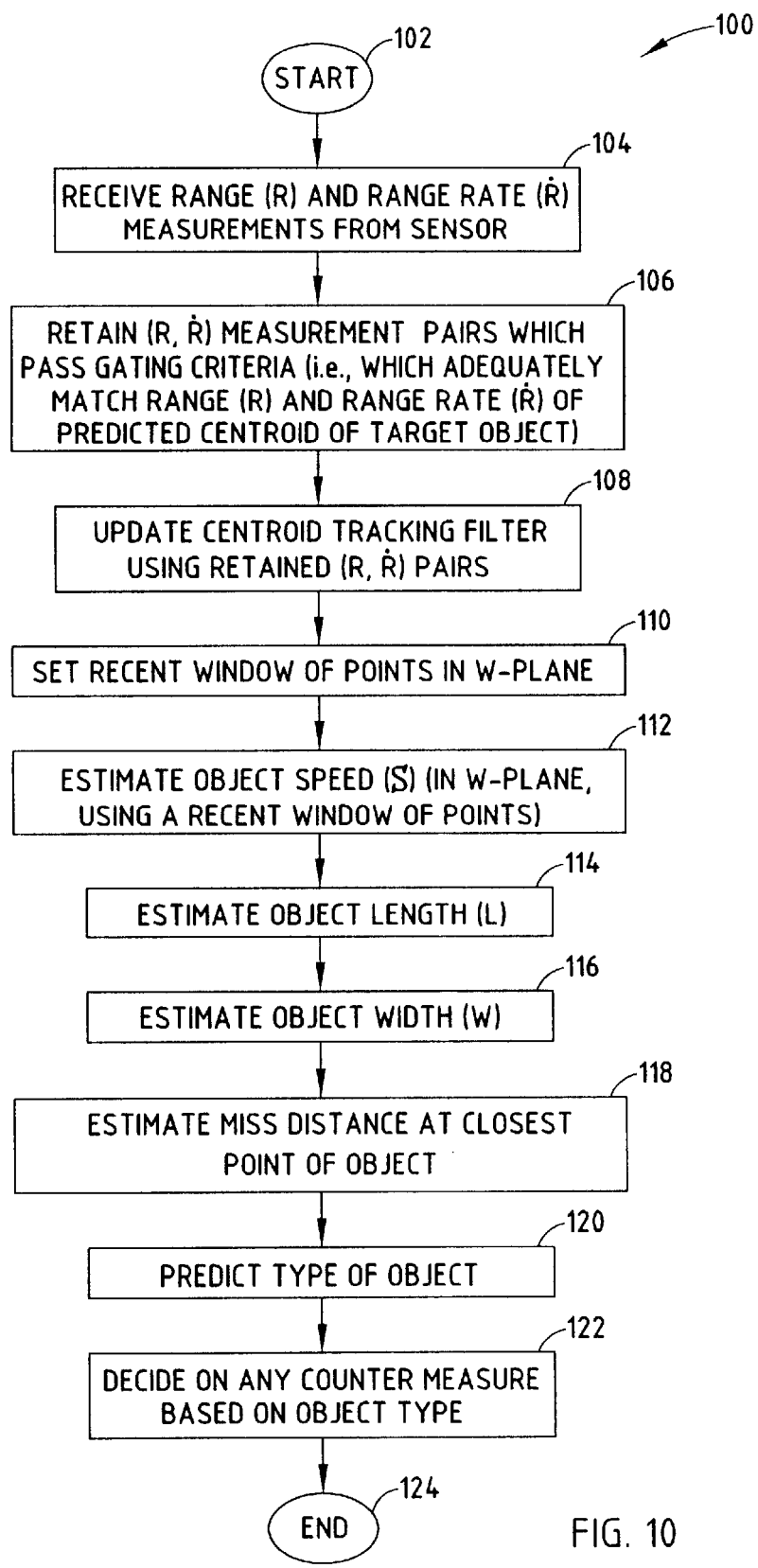
FIG. 10 is a flow diagram illustrating a routine for estimating size dimensions of an object and predicting the type of object.
Figure 11:
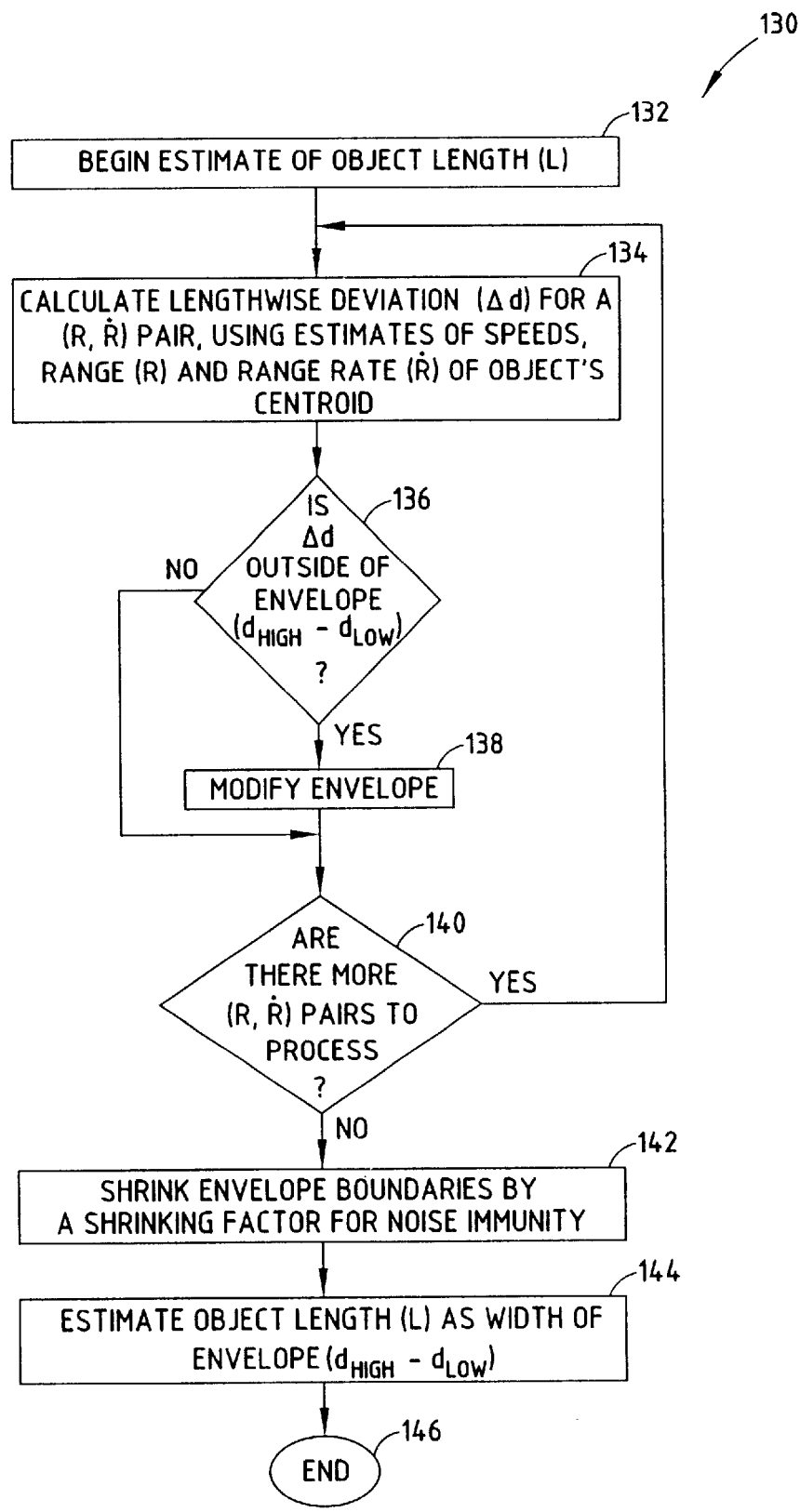
FIG. 11 is a flow diagram illustrating a routine for estimating length of an object according to the present invention.
Figure 12:
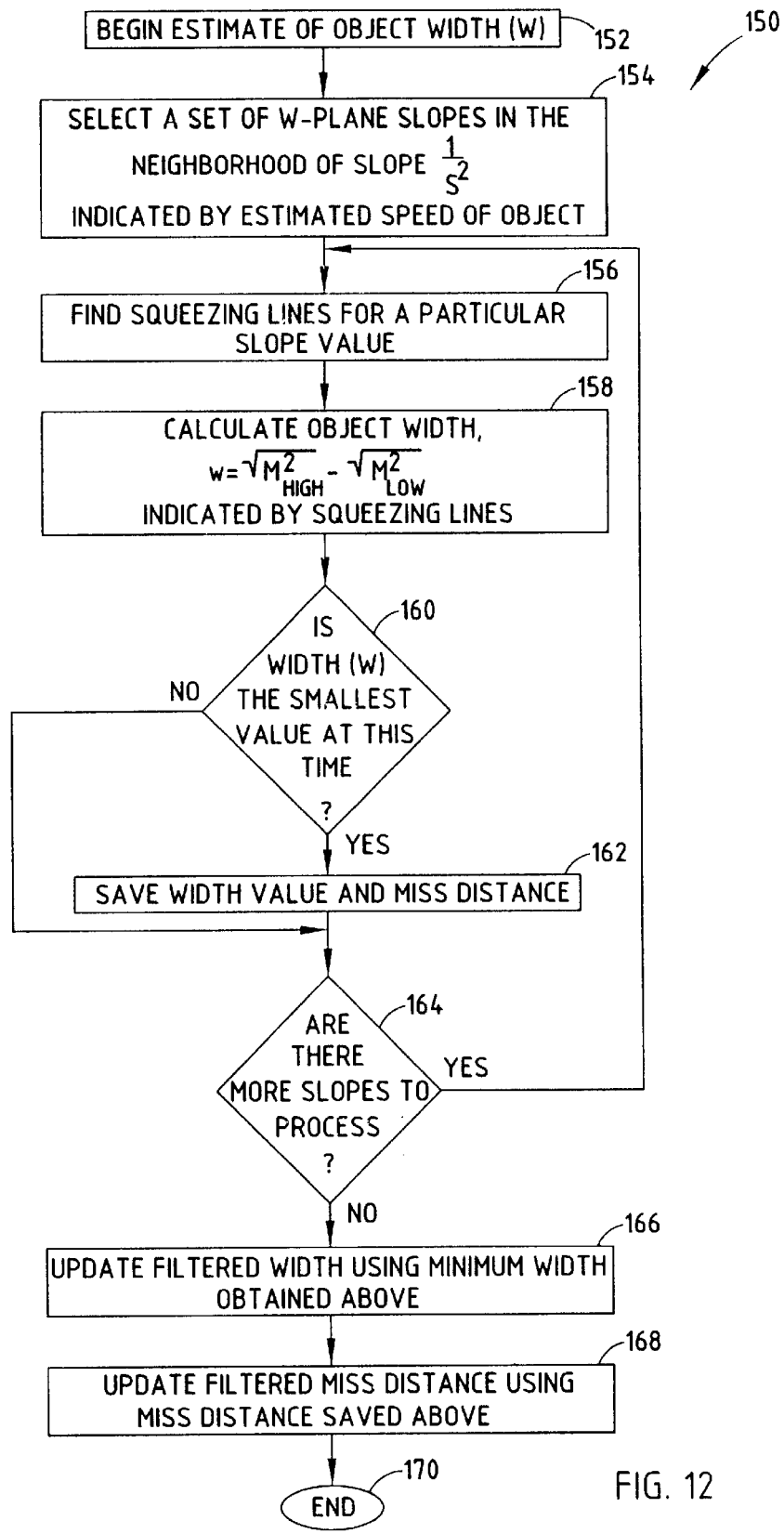
FIG. 12 is a routine for estimating width of an object according to the present invention.

Referring to FIG. 3, an object length, width, and miss distance estimator 32 is generally shown receiving the range measurement R and range rate measurement $\dot{R}$, both generated by sensor 12. The range and range rate measurements R and $\dot{R}$ are processed by the estimator 32, which includes a programmed routine as shown in FIG. 4 to estimate the miss distance M, and object size estimation routines as shown in FIGS. 10–12 to estimate length L and width W of the target object 16. In addition, the miss distance estimator 32 may also estimate speed S of the target object 16.

The miss distance estimation and the object length and width estimations of the present invention assume that the target object 16 is moving straight and at a constant speed relative to the host vehicle 10. The target object heading (i.e., the direction of speed S on line 17) is assumed to be constant, however, if the target object 16 is not moving directly toward or away from the host vehicle 10, then the radial angle is changing. Hence, the miss angle γ is changing and the range rate $\dot{R}$ is changing. The miss angle γ is the angle between a line extending radially from the vehicle 10 to the object 16 and the line 17 in the direction of movement of the object 16. If exact measurements of range R and range rate $\dot{R}$ are available at time instant k and k+1, the speed of the object can be obtained.

Miss Distance Estimation

Referring to FIG. 4, a routine 40 is illustrated for estimating the miss distance M of a target object and determining a collision detection signal 26. Routine 40 begins at step 42 and proceeds to step 44 to receive the sensor measurement data, including the range measurement R and range rate measurement $\dot{R}$, for each object sensed within the sensor field of view. Next, in step 46, routine 40 associates data with the particular target object by way of an object tracker. The object tracker tracks each object based on the combination of range and range rate measurements R and $\dot{R}$. If the current range and range rate measurements R and $\dot{R}$ are sufficiently close in value to the predicted range and range rate values, the object measurements are assumed to pertain to the same object. The tracking of each detected object allows for a consistent stream of measurement data at incremental time periods k, k+1, k+2, etc. for each sensed object.

Proceeding to step 48, routine 40 computes a mathematical square of the range R as shown by $R^2$, and also computes a mathematical square of the product of range and range rate as shown by $(R \cdot \dot{R})^2$ for each of X number of most recent measurements for a tracked object. The squared range and squared product of range and rate values $R^2$ and $(R \cdot \dot{R})^2$, respectively, for each of X measurements are preferably stored in memory and are processed by controller 20 as explained herein. It should be appreciated that the number X of measurements may include thirty (30), according to one example, or may include fewer or greater number of measurements. Processing of a greater number of measurements may result in less noise, but may be less responsive to maneuvers between the object and the host vehicle. Accordingly, the number X of measurements selected is a compromise and may vary depending on the application.

Figure 5:
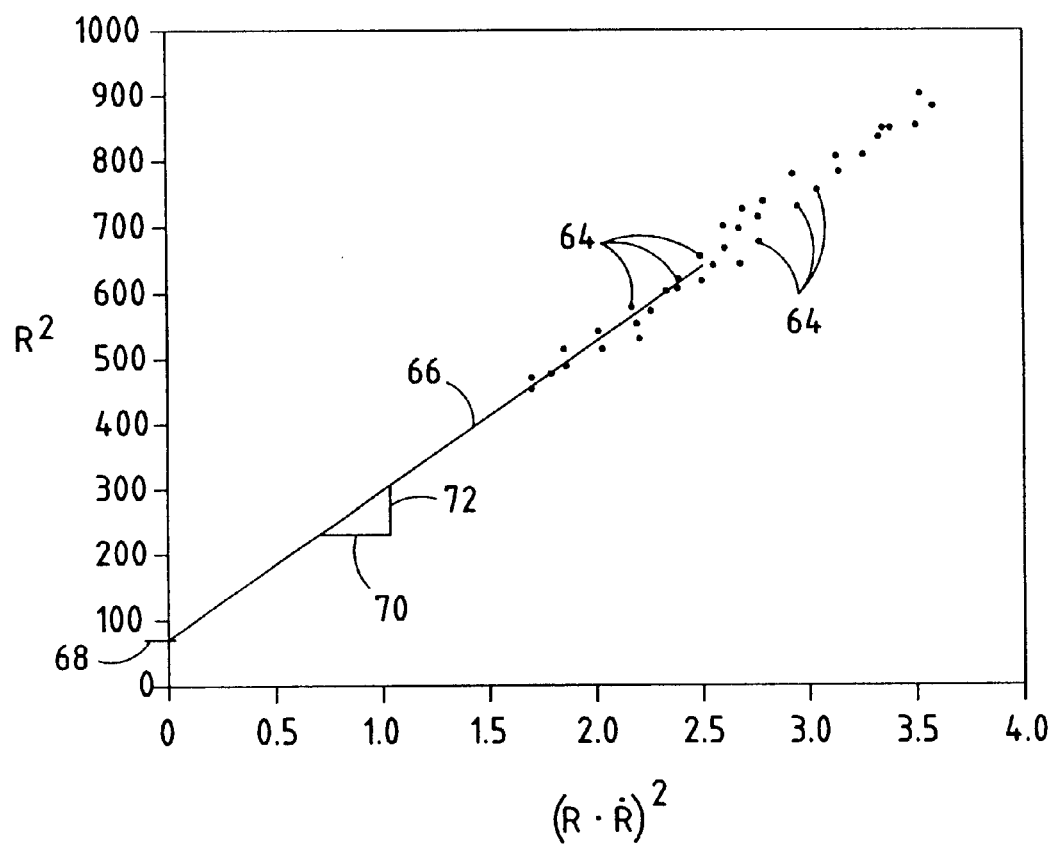
FIG. 5 is a graph illustrating estimation of the miss distance using a curve in a W-plane defined by range squared and the product of range and range rate squared.

Proceeding to step 50, routine 40 generates a least-squares fit line (curve) for a window of recent data for the tracked object in a plane, referred to herein as the W-plane. The W-plane is defined as a plane having data plotted on X-axis and Y-axis coordinates, such as is shown in FIG. 5. The Y-axis coordinate represents the squared range $R^2$ values, while the X-axis coordinate represents the squared product of range and range rate $(R \cdot \dot{R})^2$ values. The pairs of computed values for each data measurement may be plotted in the W-plane as shown by points 64 for X number of measurements. A least-squares fit line 66 is generated based on a close fit to the plurality of plotted measurements 64. While a least-squares fit line is shown and described herein, it should be appreciated that other curves, both linear and non-linear, may be defined based on the pairs of data for X measurements 64. While X measurements are shown plotted in a W-plane, it should be appreciated that the controller 20 may process the data without providing a viewable plot, as the plot is merely illustrative of the processing of the data provided by a microprocessor-based controller 20.

In step 52, routine 40 extracts estimates of the miss distance M and speed S of the object from the fitted line 66 shown in the W-plane. As seen in FIG. 5, the curve 66 crosses the vertical axis defined by the squared range $R^2$ at a point 68 when the squared product of range and range rate $(R \cdot \dot{R})^2$ is equal to zero. At point 68, when the squared product of range and range rate is equal to zero, the miss distance M is defined as the square root of the squared range $R^2$ value (M=$\sqrt{R^2}$). Thus, point 68 is the measured point at which the object reaches the closest anticipated point of approach to the host vehicle. In the event that point 68 crosses the squared range $R^2$ axis at a negative value, $R^2$ is set to a value of zero.

The miss distance M and speed S may be estimated from an interpretation of the fitted curve 66. This relationship, according to one embodiment, is shown in the following equation:

$$R^2 = M^2 + \frac{1}{S^2}(R \cdot \dot{R})^2$$

wherein $$\frac{1}{S^2}$$

represents the slope of curve 66 as defined by horizontal segment 70 and vertical segment 72. Accordingly, the speed S of the object relative to the vehicle may be estimated based on the slope of curve 66. It should be appreciated that the miss distance M is the distance that the target object would have come closest to the vehicle 10 if the object continued along the instantaneous curve. For a target object which is moving straight at constant speed, the points plotted in the W-plane form a straight line with an intercept on the $R^2$ axis having a value equal to $M^2$ and with a slope of $$\frac{1}{S^2}.$$

While a straight line curve 66 is shown, it should be appreciated that some higher-order curve may be employed to define the relationship of the sample points.

Referring back to FIG. 4 and proceeding to step 52, routine 40 calculates the time to closest point-of-approach $T_{CPA}$ for the target object. The time to closest point-of-approach $T_{CPA}$ can be calculated based on range, range rate, and a calculated acceleration of the object in the radial direction. Next, in decision step 56, routine 40 determines if the following two conditions are met: (1) is estimated miss distance M less than threshold 1; and (2) is $T_{CPA}$ less than threshold 2. If both conditions are met in step 56, routine 40 generates an output signal to provide a signal warning or to deploy countermeasures in step 58. The countermeasures may include pretensioning a seat belt pretensioner, providing a warning, or initiating other appropriate action. It should be appreciated that the estimated miss distance M may be used to determine if an imminent collision is anticipated or may be employed to determine if a close collision is anticipated. By estimating the time to closest point-of-approach $T_{CPA}$, the time of an anticipated collision or a near collision event can be monitored and employed to timely employ any countermeasure devices such as a seat belt pretensioner. If either of the above conditions in step 56 is not met, routine 40 ends at step 60.

The miss distance estimation assumes that the target object 16 is moving straight and at a constant speed relative to the host vehicle 10. If variations in speed and/or direction of the object 16 occur relative to the host vehicle 10, the successive instantaneous measurements will account for variations in direction or speed. While the miss distance estimation has been described in connection with a linear curve 66, it should be appreciated that higher-order curves (e.g., parabolas) may be employed. It should further be appreciated that the use of a weighting matrix in the curve fitting process (e.g., based on the inverse of range squared) and accounting for the correlation between errors in the two W-plane quantities in the curve fitting process may also be provided.

Object Length and Width Estimations

The collision detection system of the present invention estimates the size of object 16 by estimating the length L and width W of the object moving through the field of view 14 of the radar sensor 12. In doing so, the vehicle collision detection system 18 processes a sequence of range and range rate measurements R and $\dot{R}$ of each target object 16, exploits differences in range and range rate measurements R and $\dot{R}$ monitored over the span of the distributed object 16, and provides running estimates of the length L and width W of the object 16 as described herein. It should be appreciated that the scattering centers for each radar sensor measurement taken are ideally distributed over the span of the object 16, and the collision detection system is tuned to isolate the individual scatterers, rather than lumping such measurements together into one return.

The following explanation of estimating length L and width W of the object 16 assumes that only one object is detected in the sensor field of view 14. However, it should be appreciated that multiple objects may be detected within the sensor field of view 14 by employing additional processing to associate such radar returns with each specific object tracked. It is also assumed that both the host vehicle 10 and the target object 16 are in uniform motion (moving straight at constant speed). The assumption of uniform motion allows for conceptual viewing of the host vehicle 10 as being stationary and focuses on relative velocity of the target object 16 relative to the host vehicle 10. According to this assumption, the host vehicle 10 may be considered stationary, and therefore the target object's velocity and the object's velocity relative to the host vehicle are considered the same.

The length L and width W estimates are obtained by exploiting the differences in range and range rate of the distributed object 16 by analyzing the data in the W-plane. The data for consecutive sensed range and range rate measurements R and $\dot{R}$ is processed in the W-plane as described above in connection with FIG. 5 as a function of range squared and the square of range and range rate. As shown in FIG. 5, a point target in uniform motion relative to the host vehicle 10 traces a straight line in the W-plane with the line intercepting the vertical axis at a point 68 that is equal to the square of the miss distance M, and the line has a slope related to relative speed of the object $$\left(\frac{1}{S^2}\right).$$

The distance (d) between the target object 16 and a point where the miss distance M occurs is referred to as the distance to closest point-of-approach.

Figure 6:
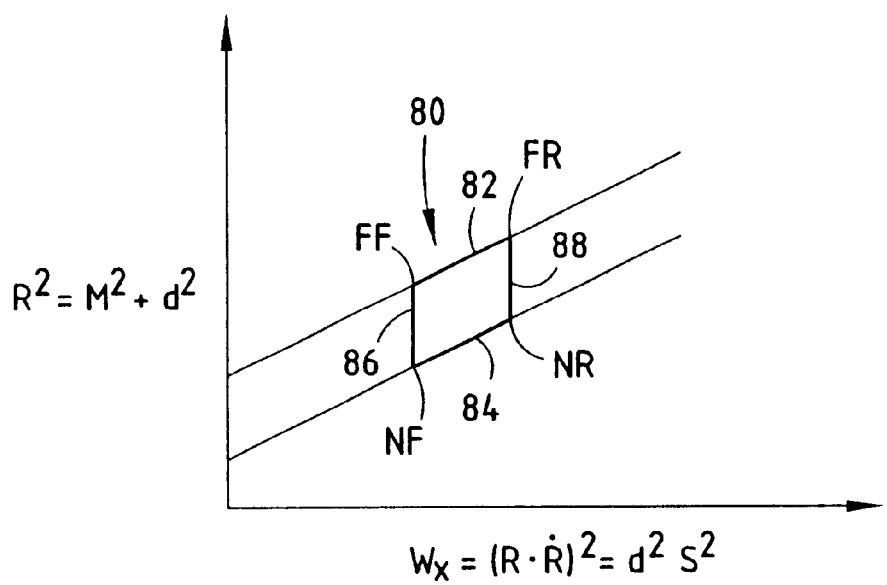
FIG. 6 is a graph illustrating estimation of length and width dimensions of an object using a curve in the W-plane.

The vertical and horizontal axes of the W-plane can further be represented in terms of the miss distance M, the distance d between the sensed location on the object and the anticipated closest point-of-approach, and the relative speed S of the target object as shown in FIG. 6. Specifically, the vertical axis may also be represented by $M^2+d^2$, and the horizontal axis may also be represented by $d^2S^2$. The data shown in the W-plane of FIG. 6 is for a sensed target object having a relatively flat rectangular shape, such as an automotive vehicle, moving with a relative velocity that is parallel to the longitudinal axis of the target object (vehicle). Due to the distributed shape of the target object, the radar sensor signal returns from various locations on the object form a parallelogram pattern 80 in the W-plane. The pattern 80 moves in the W-plane as the object 16 moves relative to the host vehicle 10. The front edge of the object 16 defined by the near front (NF) corner and the far front (FF) corner has a constant distance d to closest point-of-approach and, because speed S is assumed to be constant, the corresponding points plotted in the W-plane have the same horizontal axis value. The points on the front edge of the object have differing miss distance M values, however, so the front edge of the object maps into a vertical line segment 86 in the W-plane. Likewise, the rear edge of the object 16 defined by the near rear (NR) corner and the far rear (FR) corner maps into a vertical line segment 88 in the W-plane. The points on the near side of the object 16 have the same miss distance M value, but differing distance d to closest point-of-approach values. Consequently, the near side of the object 16 maps into a sloped line segment 84 in the W-plane having a slope of $$\frac{1}{S^2},$$

whereas the far side of the object 16 likewise maps into a slope line segment 82 in the W-plane having a slope of $$\frac{1}{S^2}.$$

Accordingly, the shape of the rectangular object is shown in FIG. 6 in the W-plane to be a parallelogram pattern 80. With radar signals returned and processed from various points on the distributed object 16, the length L of the object 16 can be estimated from the horizontal dimension of the parallelogram in the W-plane, and the width W is related to the length of the vertical edge dimension. By processing this information, the detection system of the present invention is able to estimate length L and width W of the object 16.

Figure 7A:
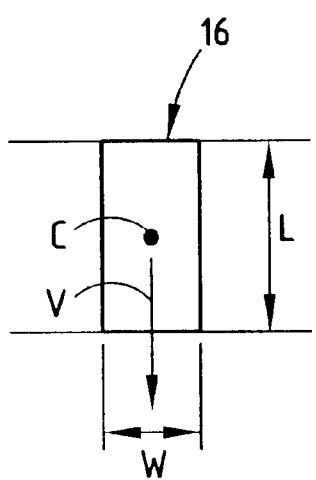
FIGS. 7A and 7B are plan views illustrating the geometry of an object having dimensions estimated according to the present invention.
Figure 7B:
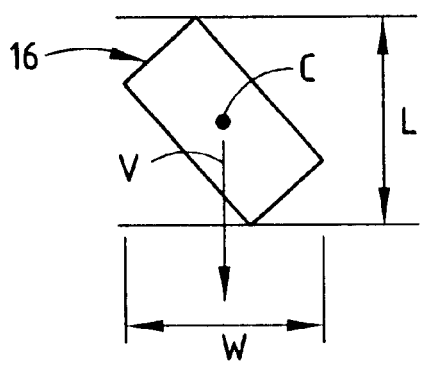

A distributed object 16 is shown in FIG. 7A relative to a stationary host vehicle, and is also shown in FIG. 7B relative to a moving host vehicle. The length L of the object 16 is defined as the span of the object 16 in a direction parallel to the relative velocity vector V. The length L may further be defined as how close of a distance together two planes orthogonal to the relative velocity vector can be squeezed and still enclose the target object. For a stationary host vehicle 10 and a moving target vehicle 16, the length L is simply the length of the moving target vehicle 16. In a situation when both the host vehicle 10 and the target object 16 are moving, the relative velocity vector V may not be parallel to the longitudinal axis of the target object 16, in which case the length L of the object 16 may be somewhat corrupted by its width as seen in FIG. 7B. Similarly, the width W of the object 16 may be somewhat corrupted by the length as shown in FIG. 7B.

Figure 8:
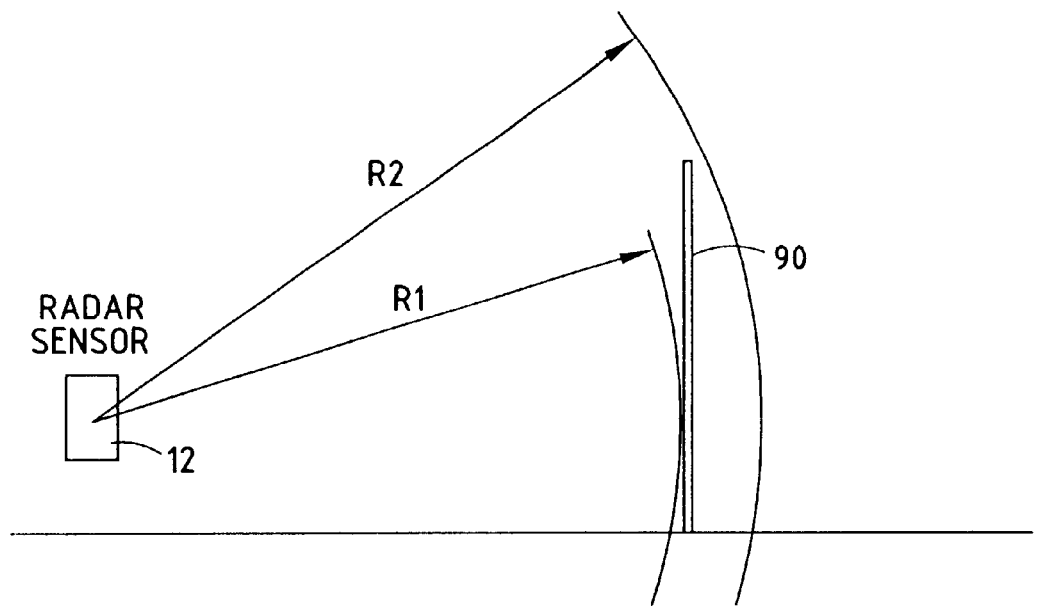
FIG. 8 is a plan view illustrating detection of a tall thin object.

The width W is defined as the measurement direction orthogonal to the relative velocity vector V. It can be assumed in some situations that the target object 16 has a negligible height. If the object has a non-negligible height that is readily viewable in the field of view 14 of the sensor 12, then the width estimate W may be corrupted by the height. An example of non-negligible height of an object is illustrated in FIG. 8 in which the sensor 12 is shown detecting a tall thin pole 90 having a relatively small width and a large vertical height. The radial distance R1 depicts the shortest range to the target object, and radial distance R2 depicts the longest range to the target object. The width W of the pole is estimated as the difference in distance R1 and R2 (R2–R1). Ranges R1 and R2 are measured in cross section view only and generally are not the shortest and longest ranges to parts of the target host, except when it is at the closest point-of-approach.

To estimate length L and width W of an object, the detection system tracks some point on the target object and relies on occasional radar signal returns from a variety of locations over the span of the distributed object to estimate dimensions of target length L and width W by deviations from the tracked point. This is because generally radar signal returns are not consistently available from all points on the object. The tracked point may be the center point as shown in FIGS. 7A and 7B or any other point and is referred to herein as the centroid C. Tracking of the centroid C is referred to herein as centroid tracking. The centroid tracking occurs in the range-range rate plane and is mapped into the W-plane for comparison to raw radar signal returns.

A routine 100 is illustrated in FIG. 10 for estimating the length and width dimensions of an object, predicting the object type, and deciding on any countermeasures according to the present invention. The routine 100 begins at step 102 and proceeds to receive range and range rate measurements R and $\dot{R}$ from sensor 12 in step 104. Next, in step 106, routine 100 retains the measurement pairs of R and $\dot{R}$ which pass gating criteria. The gating criteria requires that raw radar signal returns be gated such that the data is used only if it adequately matches the predicted centroid range and range rate of a target object. Routine 100 updates the centroid tracking filter in step 108 so as to update the centroid range and range rate using the retained data pairs (R and $\dot{R}$). A recent window of points are set in the W-plane in step 110. Thereafter, in step 112, the speed S of the object is estimated in the W-plane using the recent window of points. The speed S of the object can be estimated by modeling the object as a non-distributed point. By knowing the object speed S, deviations in the data in the W-plane may serve as indictors of length L of the object.

In step 114, routine 100 estimates the dimension of length L of the object according to the present invention. The object length L estimation is generated by length estimation routine 130 which is shown particularly in FIG. 11 and described below. The object width W is estimated in step 116, and is generated by routine 150 which is particularly shown in FIG. 12 and described below. Routine 100 further estimates the miss distance M of the object at the closest point-of-approach in step 118. By estimating object length L and width W, routine 100 may be able to predict the type of object in step 120 based on the estimated size dimensions of width W and length L. Prediction of the type of object may include comparing the estimated size dimensions to known object criteria, such as size dimensions of vehicles, pedestrians, and other objects. Finally, routine 100 decides on any countermeasures to deploy based on the object type in step 122. Countermeasures may include pretensioning a seat belt pretensioner just prior to an anticipated collision, warning the driver of an anticipated collision, or performing any other action. It should be appreciated that the type of countermeasure deployed may be dependent on the predicted size of the object. In addition, routine 100 may decide not to deploy any countermeasures based on detection of an object of a sufficiently small size. Finally, routine 100 ends in step 124.

Referring particularly to FIG. 11, the routine 130 for estimating length L of the object is illustrated therein. Length estimation routine 130 begins at step 132 and proceeds to step 134 to calculate a lengthwise deviation $\Delta d$ for a data pair (R, $\dot{R}$) using estimates of speed S, centroid range $R_{cent}$, and centroid range rate $\dot{R}_{cent}$, of the object centroid C. Since raw radar signal returns are interpreted in the W-plane as lengthwise deviations $\Delta d$ from the centroid C, the lengthwise deviation $\Delta d$ is the difference in value of distance d between a radar signal return and the tracked centroid C. The lengthwise deviation $\Delta d$ can be estimated according to the following equation:

$$\Delta d = \frac{\sqrt{(R\dot{R})^2} - \sqrt{(R_{cent}\dot{R}_{cent})^2}}{S}$$

where $\Delta d$ is the lengthwise deviation between the scattering center producing the radar signal return and the location of the tracked centroid C, R is the raw range, $\dot{R}$ is the raw range rate, $R_{cent}$ is the estimated range to the centroid, $\dot{R}_{cent}$ is the estimated centroid range rate, and S is the estimated target relative speed.

The lengthwise deviation $\Delta d$ is monitored to detect the lengthwise deviations for the rear and front of the object, referred to herein as deviations $d_{HIGH}$ and $d_{Low}$, respectively. The quantities $d_{HIGH}$ and $d_{Low}$ describe an envelope about the centroid C. When a value of the lengthwise deviation $\Delta d$ is calculated which is outside of the envelope ($d_{HIGH}$–$d_{Low}$), the appropriate envelope boundary is stretched outward partway toward the new value. This is shown in decision step 136 in which routine 130 determines if the lengthwise deviation $\Delta d$ is outside of the envelope and, if so, the envelope is modified in step 138. The envelope is stretched only partway in order to provide some noise immunity. The coefficient defining the partway stretching may be adjusted to balance between measurement noise and the frequency with which extreme points on the object are expected to appear in the radar signal returns. If the extreme points are expected to be visible quite frequently, then the partway coefficient does not need to be very large.

In decision step 140, length estimation routine 130 checks for whether there are more (R, $\dot{R}$) pairs to process and, if so, returns to step 134. If there are no more (R, $\dot{R}$) pairs to process, routine 130 proceeds to step 142 to shrink the envelope boundaries by a shrinking factor for noise immunity. The envelope boundaries are shrunk towards the centroid with time, according to a calibration time constant. This provides further noise immunity by mitigating the effect of noisy returns over time. Next, the object length L is estimated as the width of the envelope ($d_{HIGH}$–$d_{LOW}$) in step 144. Accordingly, the length L of the object is estimated as the difference between the upper and lower edges of the envelope ($d_{HIGH}$–$d_{LOW}$). Finally, routine 130 ends at step 146.

Figure 9:
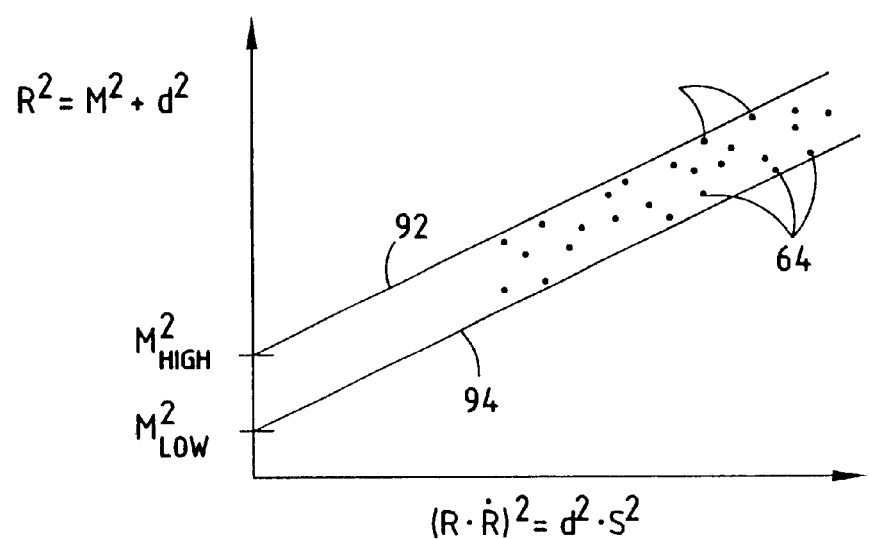
FIG. 9 is a graph illustrating a pair of squeezing lines for estimating width of the object according to the present invention.

The estimation of the width W dimension uses a batch of recent measurements 64 (e.g., 300 milliseconds) plotted as points in the W-plane, such as shown in FIG. 9. The speed S of the target object defines a line slope in the W-plane. Parallel lines 92 and 94 are shown having a slope in the neighborhood of the speed-indicated slope are found which have minimum vertical separation and which enclose all or substantially all of the points 64 plotted in the W-plane. The vertical distance between parallel lines 82 and 84 is shown as $$M_{HIGH}^2 - M_{LOW}^2$$

which provides an indication of the object width W. The raw width W measurements are lightly filtered to produce final width estimates.

Referring to FIG. 12, a routine 150 for estimating width W of an object is illustrated therein. Width estimation routine 150 begins at step 152 and proceeds to step 154 to select a set of W-plane slopes in the neighborhood of slope $$\frac{1}{S^2}$$

indicated by the estimated speed of the object. Next, in step 156, routine 150 finds squeezing lines 92 and 94 for the particular slope value. Based on the squeezing lines 92 and 94, width estimation routine 150 calculates the object width W in step 158. Width W is shown computed as a function of the square root of the maximum miss distance squared ($M_{HIGH}^2$) minus the minimum miss distance squared ($M_{LOW}^2$) according to the following equation:

$$W = \sqrt{M_{HIGH}^2} - \sqrt{M_{LOW}^2}$$

The width estimation routine 150 checks, in decision step 160, if the width W is the smallest value at this time and, if so, saves the width value W and miss distance M in step 162. Otherwise, routine 150 proceeds to decision step 164 to check if there are more slopes to process and, if so, returns to step 156. If there are no more slopes to process, routine 150 updates the filtered width in step 166 using the minimum width W, and also updates the filtered miss distance in step 168 using the minimum miss distance M of all points detected on the distributed object 16, before ending in step 170. Accordingly, the width W of the object is estimated as a function of the squeezing lines 92 and 94 defined by the measured points in the W-plane.

An alternative approach to estimating width W of the object could be made analogous to the estimation of length L as described above, in which a centroid C is tracked and vertical deviations of raw radar signal returns from the centroid C in the W-plane are interpreted as providing width envelope information.

Accordingly, the collision detection system 18 and routines of estimating miss distance M and length L and width W of an object advantageously estimate the miss distance M of a target object and estimate length L and width W dimensions of the object without requiring the measurement of an azimuth angle of the object. As a consequence, the present invention is able to employ less complex and less expensive sensing components, thus providing cost savings. By processing the estimated miss distance M, the collision detection system 18 advantageously estimates an anticipated collision and allows for timely responsive action to be taken. The estimated length and width dimensions enable the collision detection system 18 to better determine the type of countermeasures to be employed. If the size of the object is sufficiently small, the collision detection system 18 may decide not to employ any countermeasures. For larger objects, the collision detection system 18 may employ countermeasures to a greater degree as compared to smaller objects. Further, it should be appreciated that the estimated width W enables enhanced accuracy estimation of the miss distance M by advantageously estimating the miss distance to the closest point on a distributed object.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A detection system for detecting a size dimension of an object, said system comprising:
    a sensor for sensing an object in a field of view and measuring range to the object and determining range rate of the object; and
    a controller for estimating a size dimension of the object as a function of the range and range rate, wherein the controller estimates the size dimension absent an azimuth angle measurement of the object.

2. The detection system as defined in claim 1, wherein the size dimension comprises length of the object.

3. The detection system as defined in claim 2, wherein the controller further computes a mathematical square of the range and computes a mathematical square of the product of range and range rate for each of a plurality of measurements, said controller estimating the length of the object as a function of the computed squared range and the squared product of range and range rate for a plurality of measurements distributed about the object.

4. The detection system as defined in claim 3, wherein the controller estimates length of the object as a function of lengthwise deviation of the signals received from various locations on the distributed object.

5. The detection system as defined in claim 1, wherein the size dimension comprises width of the object.

6. The detection system as defined in claim 5, wherein the controller further computes a mathematical square of the range and computes a mathematical square of the product of range and range rate for each of the plurality of measurements, said controller estimating the width of the object as a function of the computed squared range and the squared product of range and range rate.

7. The detection system as defined in claim 6, wherein the controller determines a pair of squeezing lines defining a plurality of measurements, wherein the width of the object is estimated as a function of the pair of squeezing lines.

8. The detection system as defined in claim 1, wherein the sensor is located on a vehicle.

9. The detection system as defined in claim 1, wherein the sensor comprises a radar sensor.

10. The detection system as defined in claim 9, wherein the range rate is measured based on Doppler effect.

11. The detection system as defined in claim 1, wherein the controller further estimates miss distance of the object.

12. The detection system as defined in claim 11, wherein the controller computes miss distance as a function of the estimated size dimension of the object.

13. A method of estimating a size dimension of an object, said method comprising the steps of:
    sensing the presence of an object;
    tracking the object;
    measuring range to the object;
    determining range rate of the object; and estimating a size dimension of the object as a function of the range and range rate, wherein the estimation of the size dimension is computed absent an azimuth angle measurement of the object.

14. The method as defined in claim 13, wherein the step of tracking the object comprises tracking the object relative to a vehicle.

15. The method as defined in claim 13, wherein the step of estimating a size dimension of the object comprises estimating length of the object.

16. The method as defined in claim 15 further comprising the steps of:

computing a mathematical square of range for each of the plurality of measurements; and computing a mathematical square of the product of range and range rate for each of the plurality of measurements, wherein the length of the object is estimated as a function of lengthwise deviations taken at various locations on a distributed object.

17. The method as defined in claim 13, wherein the step of estimating a size dimension of the object comprises the step of estimating width of the object.

18. The method as defined in claim 17 further comprising the steps of:

computing a mathematical square of range for each of the plurality of measurements; and computing a mathematical square of the product of range and range rate for each of the plurality of measurements, wherein the width of the object is estimated as a function of a pair of squeezing lines defining a plurality of measurements.

19. The method as defined in claim 13, wherein the step of determining range rate of the object comprises measuring range rate based on Doppler effect.

20. The method as defined in claim 13 further comprising the step of estimating miss distance of the object.

21. The method as defined in claim 20, wherein the step of estimating miss distance comprises estimating miss distance as a function of the estimated size dimension of the object.

* * * * *